A. W. PERRY.
SELF CLEANING RAKE.
APPLICATION FILED APR. 9, 1915.
1,182,789. Patented May 9, 1916.
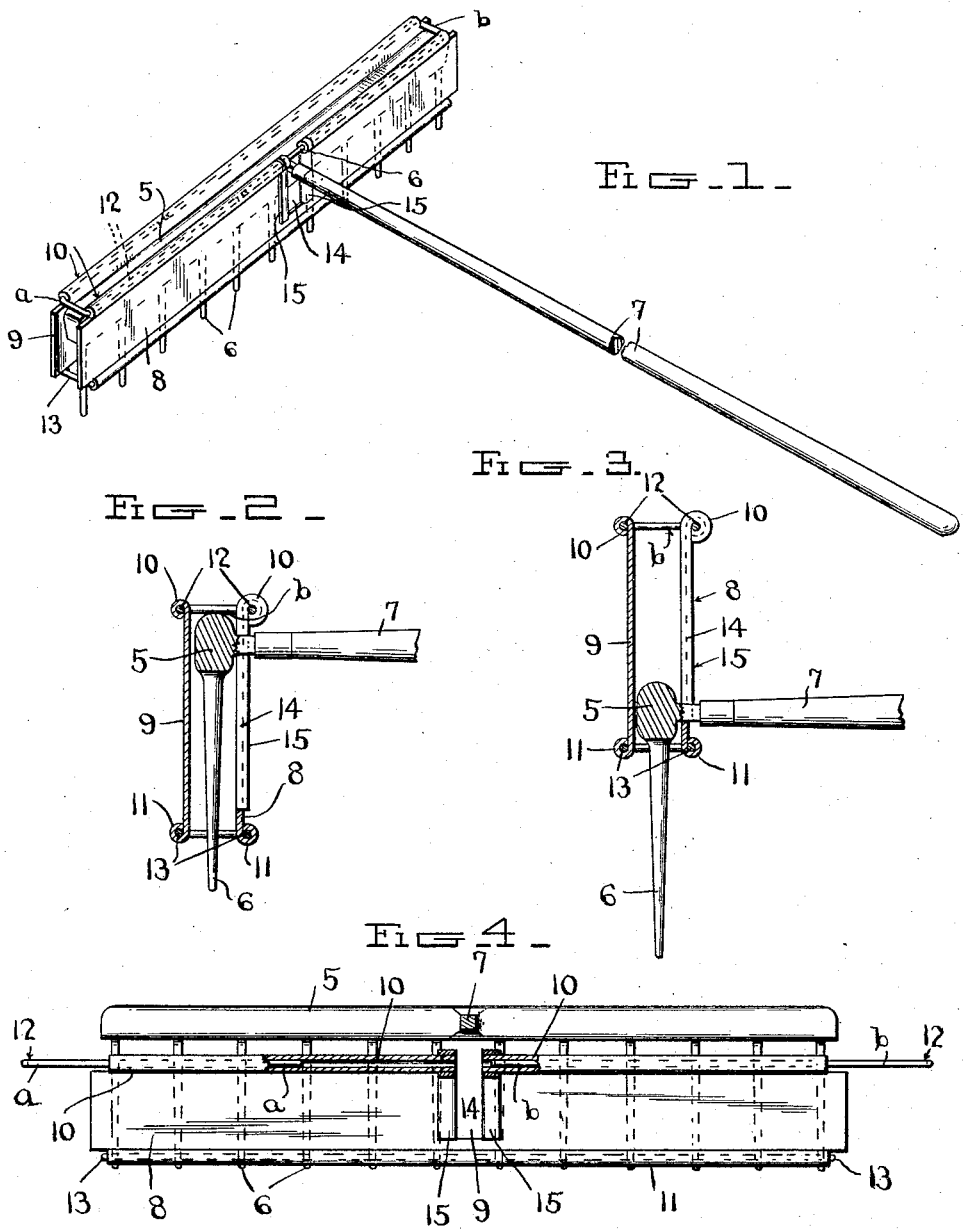

and State of Rhode Island, have invented
UNITED STATES PATENT OFFICE.

AMOS W. PERRY, OF WAKEFIELD, RHODE ISLAND.

SELF-CLEANING RAKE.

1,182,789.  Specification of Letters Patent.  Patented May 9, 1916.

Application filed April 9, 1915. Serial No. 20,241.

*To all whom it may concern:*

Be it known that I, AMOS W. PERRY, a citizen of the United States, residing at Wakefield, in the county of Washington and State of Rhode Island, have invented certain new and useful Improvements in Self-Cleaning Rakes, of which the following is a specification.

This invention relates to self-cleaning rakes.

One object of the invention is to provide an attachment for an ordinary rake which is coöperative therewith to effectually relieve the tines of the rake of leaves, grass and other rubbish during the raking of lawns, gardens, etc.

Another object resides in the provision of a self-cleaning attachment which may be readily applied to a rake of ordinary character, and which may be readily detached therefrom and which, when applied to the rake, prevents clogging of material between the tines thereof.

A still further object resides in the provision of a self cleaning attachment for hand rakes which may be manufactured at small cost and which may be readily applied or removed from the rake.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings: Figure 1 is a perspective view of the invention illustrating my improved self-cleaning attachment applied thereto. Fig. 2 is a transverse sectional view through the head of the rake and a portion of the self-cleaning attachment, illustrating the attachment in one position with relation to the rake head. Fig. 3 is a similar view illustrating the attachment in another position with relation to the rake head. Fig. 4 is a front elevation of a rake with my self-cleaning attachment applied thereto, illustrating in dotted lines the manner of applying the attachment to the rake head.

Referring now more particularly to the accompanying drawings, the reference character 5 indicates a rake head of any suitable character provided with a plurality of tines 6 and a handle 7.

My improved cleaning attachment embodies a casing including front and rear bodies 8 and 9 having their longitudinal edges coiled to form parallel beads 10 and 11 adapted to take the sides of the upper and lower wire frames 12 and 13, respectively. The upper frame preferably consists of sections $a$ and $b$. The front plate 8 has a transverse slot 14 intermediate its ends through which the rake handle 7 projects and over which handle the casing slides on the rake head. By virtue of this slot 14 the rake head is restrained against undue sliding movement longitudinally in the casing, the sides of the handle engaging the sides of the slot. If desired, in order to prevent undue wear, incident to engagement of the handle with the sides of the slot, the longitudinal edges of the same may be reinforced as at 15.

To apply the cleaning attachment to the rake head, the sections $a$ and $b$ constituting the aforesaid upper frame or only section $b$ is pulled upon to slide it outwardly of the upper parallel beads 10 sufficient to take the inner ends of the one or both sections, if both extend across the slot 14, away from over the slot. The rake head is then let down into the casing through the upper end of the slot when the one or both sections of the upper frame may be forced inwardly across the upper end of said slot and thereby lock the attachment on to the rake head.

In the use of the invention the cleaning casing normally assumes the position illustrated in Figs. 1 and 2, the casing rising and falling on the rake head according to the material or objects encountered in the use of the rake. At times the casing may assume the position illustrated in Fig. 3 but, just as soon as the rake is elevated from the ground or moved away from the rubbish or obstacles or objects which may have caused the casing to assume the position shown in Fig. 3, the casing will slide downward on the rake head and thereby remove therefrom any material, such as grass, weeds, stones, or the like, which may have clogged or lodged between the tines. Thus it will be understood that my improved cleaning attachment is capable of free and easy sliding movement at all times with relation to the rake head and that the tines are more or less shielded by the cleaning attachment which is in such form as to constitute not only means for automatically cleaning the rake, but to shield the tines thereof, the attachment being in the nature of a casing for the rake head and its tines.

What is claimed is:

1. A self-cleaning attachment for rakes, comprising upper and lower frames, a plate connecting the rear sides of the frames, and a plate connecting the front sides of the upper and lower frames, said front plate having a transverse slot intermediate the ends of the attachment and through which the rake handle projects.

2. A self-cleaning attachment for rakes comprising a casing consisting of upper and lower frames, inclosing plates connecting the sides of the upper and lower frames, one of said plates having a slot intermediate its ends through which the rake handle projects, the slot having its side edges reinforced.

3. The combination of a rake including a rake head having tines and a rigidly connected handle, a casing having an open unrestricted bottom throughout its length and in which casing the rake head is located and shielded to substantially equal extent on both sides and having slidable movement transversely therein to project the tines thereof through the open unrestricted bottom of the casing, the casing also having a narrow opening in its front intermediate its ends through which the handle of the rake projects whereby longitudinal movement of the rake head in the casing is limited in its movement relative to the casing and whereby the rake head and the innermost portions of the tines and the spaces therebetween are inclosed within the casing to prevent clogging of the material between the rake tines either in the front or in the rear of the rake.

4. A self-cleaning attachment for rakes comprising a casing which is open at its top, bottom and ends and which is provided with an opening in its front intermediate its ends and which opening leads through one edge of the casing and through which opening the handle of a rake is adapted to project, and means slidable in said casing to normally close the open end of said opening to lock the rake handle in the opening and movable from across the opening to permit removal of the rake from the casing and the handle of the rake from said opening.

5. A self-cleaning attachment for rakes comprising upper and lower frames, a plate connecting the rear sides of the frames, and a plate connecting the front sides of the frames, said front plate having a transverse slot intermediate the ends of the attachment and through which the rake handle projects, said upper frame being composed of sections, one of which is slidable over and away from said transverse slot.

6. A self-cleaning attachment for rakes comprising a casing to receive a rake head and provided with a slot through which the handle of the rake may project and means carried solely by the casing and movable across said slot to close the slot and thereby lock the handle against accidental removal from the slot.

7. The combination of a rake including a rake head having tines and a handle, a casing having an unrestricted open bottom throughout its length and in which casing the rake head is located and which has slidable movement transversely therein to automatically project the tines through the unrestricted open bottom of the casing, the casing shielding both sides of the rake to equal extent and having a narrow opening in its front intermediate its ends in which the handle of the rake is positioned simultaneously with positioning the rake head in the casing and through which opening the handle projects whereby the rake head and the innermost portions of the tines and the spaces therebetween are inclosed within the casing to prevent clogging of the material between the tines either at the front or rear of the rake.

In testimony whereof I affix my signature in presence of two witnesses.

AMOS W. PERRY.

Witnesses:
HOWARD B. PERRY,
MAUDE E. TEFFT.

Copies of this patent may be obtained for five cents each, by addressing the "Commissioner of Patents, Washington, D. C."